(12) United States Patent
Rodgers

(10) Patent No.: US 6,654,460 B1
(45) Date of Patent: Nov. 25, 2003

(54) HIGH-DENSITY TELECOMMUNICATION DRAWER ASSEMBLY

(76) Inventor: E. Walter Rodgers, 5650 W. Marconi, Glendale, AZ (US) 85306

( * ) Notice: Subject to any disclaimer, the term of this patent is extended or adjusted under 35 U.S.C. 154(b) by 564 days.

(21) Appl. No.: 09/687,742

(22) Filed: Oct. 13, 2000

(51) Int. Cl.[7] .............................................. H04M 3/00
(52) U.S. Cl. ...................................... 379/326; 379/327
(58) Field of Search ................................. 379/326, 327

(56) References Cited

PUBLICATIONS

"PDA 4200 CSF" brochure, KGP Telecommunications, undated, but published prior to Oct. 1999.
"Quality and Customer Service: Our First Priorities", KGP Telecommunications brochure, undated but published prior to Oct. 1999.
"AT&T Bulk Protection Slide Drawer Assembly (SDA)" brochure, AT&T Phoenix Custom Assembly Center, undated but published prior to 1998.
"KGP Telecommunications New Products For 1994" catalog by KGP Telecommunications, published in 1994.
"Frame Book" by Porta Systems Corp., Issue 5, Jan. 1997.
AT&T "Distributing Frame Systems Product Manual, DFSPM" excerpt, Aug. 1989.
"512 Ultimate—BR Series Terminal Block" brochure by Telephone Services Inc. of Florida, Issue 2, Aug. 1990.

Primary Examiner—Ahmad F. Matar
Assistant Examiner—Rasha S. Al-Aubaidi
(74) Attorney, Agent, or Firm—Cahill, von Hellens & Glazer P.L.C.

(57) ABSTRACT

A high-density pull-out drawer assembly for telecommunications wiring includes a support frame and one or more pull-out drawers. Each pull-out drawer includes a series of fuse protection blocks for receiving removable fuses, and a series of terminal pin blocks for allowing a technician to configure incoming-lines with outgoing lines in order to provide customers with desired levels of service. A wiring raceway is provided for guiding configuration wires extending between the pins of the terminal pin block.

20 Claims, 4 Drawing Sheets

HIGH-DENSITY TELECOMMUNICATION DRAWER ASSEMBLY

BACKGROUND OF THE INVENTION

1. Field of the Invention

The present invention relates generally to the management of telecommunications cabling, and more specifically, to a fuse-protected cross-connect drawer to facilitate telephone and data communications service.

2. Description of the Relevant Art

Wiring drawers are currently used by telecommunications companies for connecting copper telephone/data communications wires from a telephone company office to a user's site. Wiring panels provided as pull-out drawers, that incorporate fuse protection panels only, are already known. Such drawers are typically arranged in a support framework or cabinet in side-by-side fashion. One of such drawers can be extended from the framework or cabinet to expose a front face of the drawer in which a plurality of removable fuses are inserted into sockets. These fuses protect the telephone company's office equipment from lightning strikes or power surges that occur at the customer site. These fuse protection drawers are typically located in an underground equipment vault known as a Controlled Environment Vault (CEV) owned by the telephone company. They may also be installed at the telephone company central office. In the case of very large customers, such as hotels or high-rise office buildings, such fuse protection drawers may be installed at the user site. However, when a customer needs to add lines, or change their service, it is typically necessary for the telephone technician to go to a separate equipment board located at the customer's site, or just outside the customer's site. The equipment board has a series of terminal pin blocks that the technician works on to determine what lines go to which wall jack in a user's facility. The technician can "wire-wrap" the ends of connecting wires to the various pins on a terminal pin block to configure the customer's service.

In the past, the wiring of the fuse protection panels was fairly straightforward, in that the incoming and outgoing lines were dedicated to particular customers of the local service provider. The fuse protection drawers did not need to provide any change-of-service functions since the incoming and outgoing lines were dedicated, and since any changes in service could be accommodated at or adjacent the user's site. More recently, as a result of deregulation, local service provider telephone companies have found that they can not dedicate incoming and outgoing lines for a particular customer. For example, a local telephone service provider may now be obligated to lease lines in the underground equipment vault to competitive signal carriers.

There is obviously a limited amount of space in such underground vaults, and the aforementioned wiring drawers used to support fuse protection blocks should ideally be capable of handling a relatively large number of incoming and outgoing signal lines to maintain a high density. At the same time, such wiring drawers must keep such large number of incoming and outgoing signal wires organized so that telephone company technicians can efficiently locate particular lines within the underground vault in order to properly maintain, modify, and diagnose such signal lines.

Accordingly, it is an object of the present invention to provide a high density drawer assembly for telecommunications wires which includes fuse protection for such lines.

Another object of the present invention is to provide such a drawer assembly which conveniently organizes a relatively large number of incoming and outgoing telecommunication lines for easy identification.

Still another object of the present invention is to provide such a high-density drawer assembly that provides ready and convenient access to each incoming and outgoing line in order to efficiently maintain, modify, and diagnose the telecommunications system.

A further object of the present invention is to provide such a drawer assembly that includes both fuse protection and the ability to flexibly configure, or modify, the coupling between a particular incoming line and a particular outgoing line, all within the same drawer assembly.

A still further object of the present invention is to provide an improved latching mechanism for selectively retaining the drawer assembly within its supporting framework until a technician needs to access such drawer assembly.

These and other objects of the present invention will become more apparent to those skilled in the art as the description of the present invention proceeds.

SUMMARY OF THE INVENTION

Briefly described, and in accordance with a preferred embodiment thereof, the present invention relates to a pull-out drawer assembly for interconnecting telecommunications wiring, including a support frame and at least one drawer slidingly supported thereby for movement between a stored position and an extended position projecting from the support frame. A first grouping of telecommunications lines extends into the support frame and are coupled to the drawer; this first group of lines might be, for example, incoming lines from a telephone company central office to provide telecommunications services. A second grouping of telecommunications lines also extends into the support frame and are also coupled to the drawer; this second group of lines might be, for example, outgoing telecommunications lines extending to a user premises.

In the preferred embodiment of the present invention, each pull-out drawer includes a series of fuse protection blocks mounted to the drawer. The fuse protection blocks each provide sockets for receiving removable fuses that protect against lightning strikes and/or power surges. Ideally, each of the incoming telecommunications lines is coupled to one of such sockets to protect such incoming line. The preferred form of the present invention also includes a series of terminal pin blocks mounted to each pull-out drawer. These terminal pin blocks are provided with wiring pins, and these wiring pins can be independently assigned to particular incoming or outgoing lines. In the case of incoming lines, the wiring pin preferably is wired through one of the aforementioned fuse sockets before reaching the incoming line to ensure fuse protection of the central office equipment.

The fuse protection blocks each have a first generally-planar face presenting the fuse protection sockets on a first side of the pull-out drawer, and an opposing rear face from which wiring terminals extend on the opposing second side of said drawer. Likewise, the terminal pin blocks each have a first generally-planar face from which the wiring pins extend in a first direction from the first side of the drawer, and an opposing rear face from which the wiring pins extend in an opposing second direction from the second side of the drawer. The first face of each fuse protection block and the first face of each terminal pin block generally lie within a common plane along the first side of the drawer.

The wiring terminals of the fuse protection blocks, and the wiring pins on the second sides of the terminal pin blocks, can be pre-wired. For example, an incoming line can be electrically coupled with a first terminal of a fuse protection socket, and a connection wire can be installed between the second terminal of the fuse protection socket and one of the wiring pins of a terminal pin block. Likewise, an outgoing line can be pre-wired to one of the wiring pins on the second side of a terminal pin block. On the other hand, the pull-out drawer assembly of the present invention is adapted to receive a series of configuration wires that can be installed by a telephone technician, and which extend between specified pairs of wiring pins along the first side of the drawer. In this manner, for example, a technician can provide an additional line to a customer merely by adding a configuration wire on the first side of the drawer between the wiring pin that leads to a fuse protection socket associated with an unused incoming line, and the wiring pin for an outgoing line leading to the user's premises.

In the preferred embodiment of the present invention, a wiring raceway is provided proximate the terminal pin blocks on the first side of the drawer for guiding the aforementioned configuration wires between their respective wiring pins. The wiring raceway includes a planar base for being secured to the first side of said drawer; outwardly-directed fingers extend from opposing first and second side edges of the base. These fingers are spaced apart from one another to permit configuration wires to be inserted therebetween through either side of the wiring raceway. In the preferred form of the present invention, each of such fingers includes a tab that projects toward a correspondingly-shaped cut-out in the next-adjacent finger for allowing a technician to insert configuration wires between the adjacent fingers, while keeping previously inserted configuration wires in place. Ideally, a first finger on one side of the raceway and a second finger on the second side of the raceway converge toward each other to form a protective overpass, or arch, above the base of the wiring raceway to help protect the wiring inside. Preferably, the fingers that form such overpass are spaced from each other by a slot which extends at an angle to the wiring raceway for allowing configuration wiring to be passed through the protective overpass.

In order to achieve a high packing density, the drawer assembly preferably includes a drawer framework, and a series of braces extend across the drawer framework spaced apart from each other by the width of the terminal pin blocks. This allows the terminal pin blocks to be supported from first and second opposing edges thereof between two successive braces.

DETAILED DESCRIPTION OF THE PREFERRED EMBODIMENT

Figure 1:
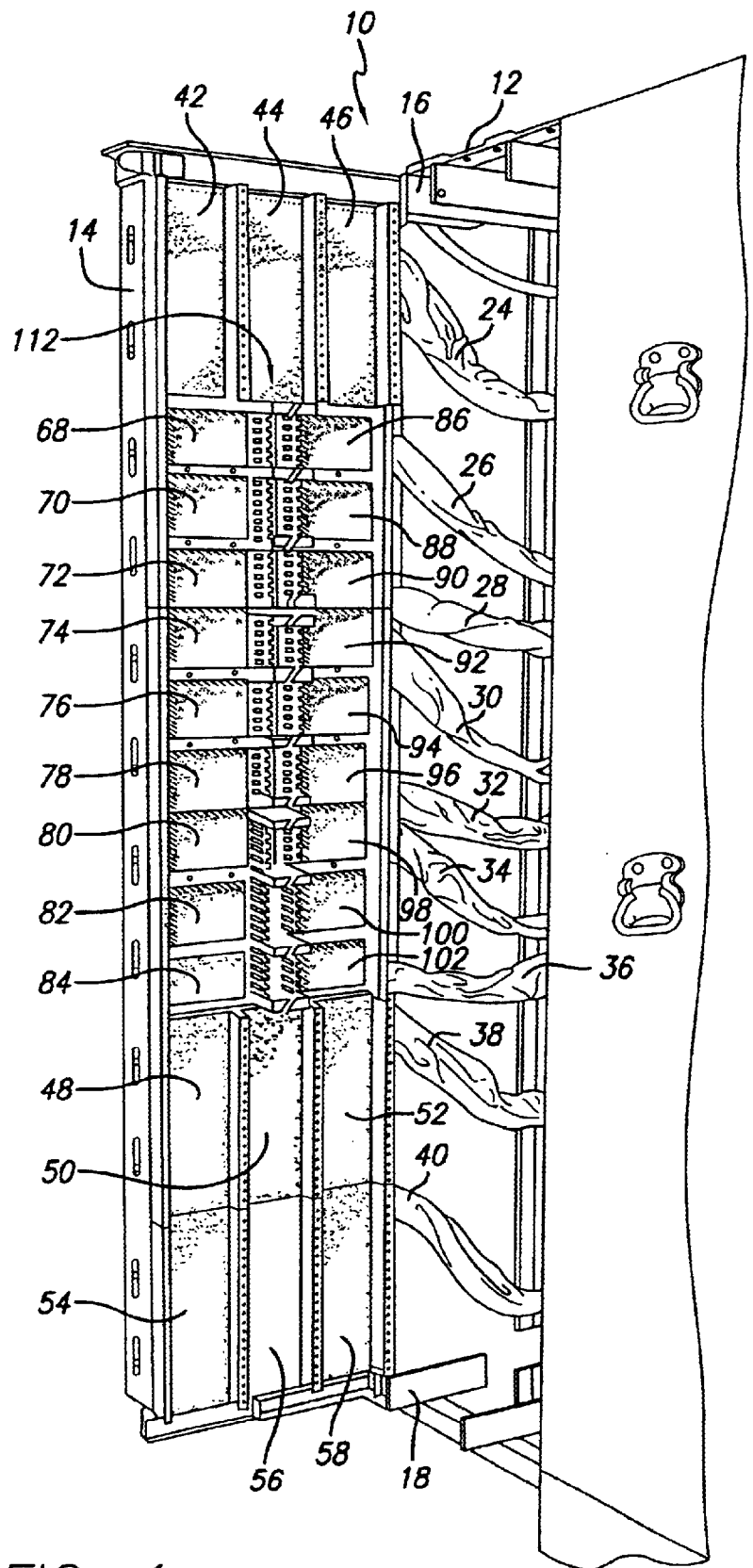
FIG. 1 is a perspective view of a high-density telecommunication drawer assembly showing one of such drawers in its extended position, and showing a first face of the drawer upon which a telecommunications technician can operate.
Figure 3:
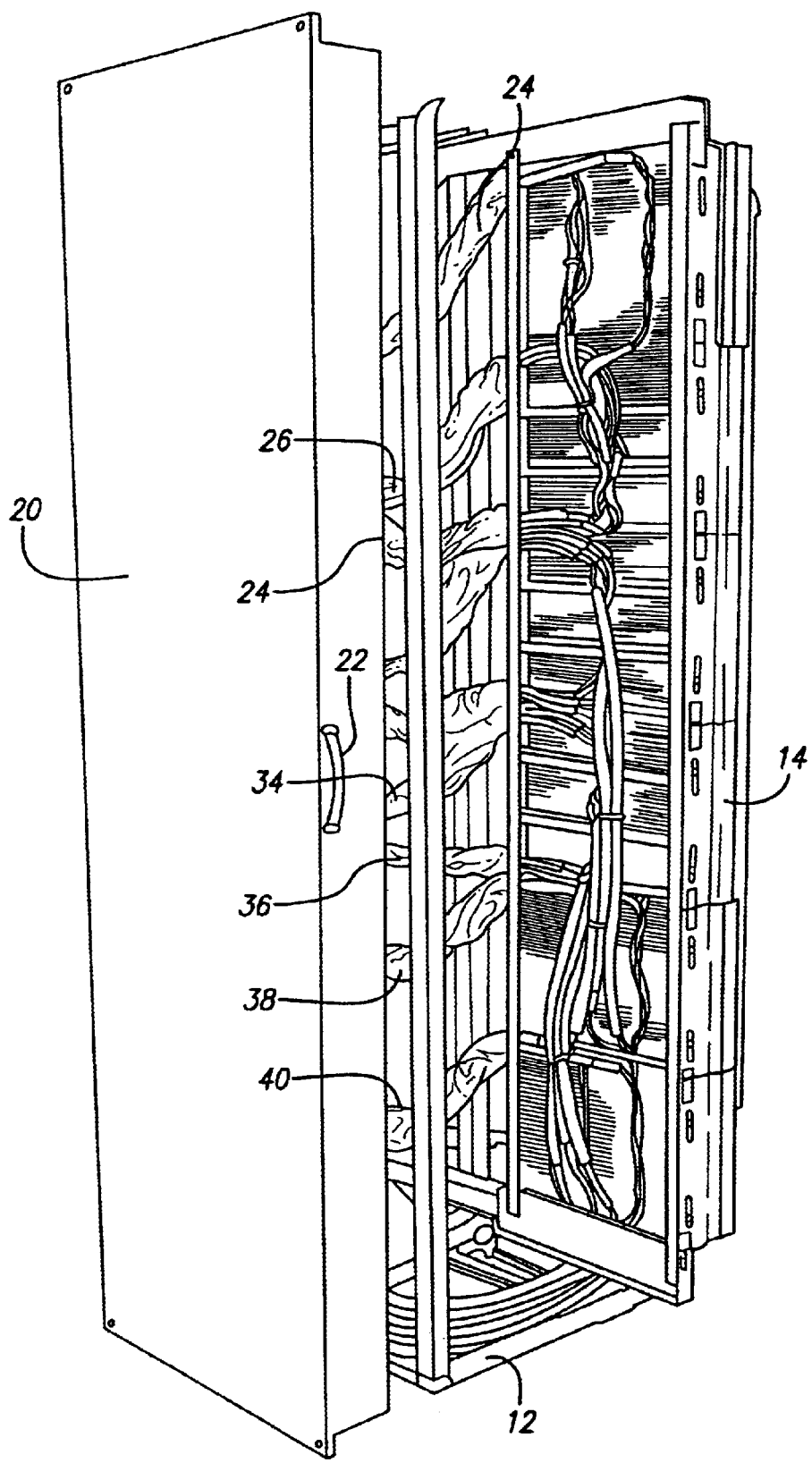
FIG. 3 is a perspective view of the rear face of the pull-out drawer shown in FIG. 1 after a protective cover has been removed.

A high-density telecommunications pull-out drawer assembly in accordance with the present invention is designated generally by reference numeral 10 in FIG. 1. Drawer assembly 10 includes a support frame 12 preferably made of metal components. A series of pull-out drawers, such as drawer 14, are supported by frame 12. Within FIG. 1, drawer 14 is shown in its extended position projecting from support frame 12, while the remaining pull-out drawers in their stored, retracted position, hidden from view within support frame 12. Each of such drawers, including drawer 14, is slidingly supported to frame 12 by an upper slide track 16 and a lower slide track 18. These slide tracks allow such drawers to be movable between the stored position and the extended position. These pull-out drawers preferably include a rectangular metal framework. Each pull-out drawer preferably includes a cover. Referring briefly to FIG. 3, drawer cover 20 has been removed to expose the rear face of drawer 14; drawer cover 20 protects the wiring installed on the back face of drawer 14, such wiring being visible in FIG. 3. A handle 22 is provided along the outer edge on drawer cover 20 to aid in pulling drawer 14 from support frame 12, and to aid in replacing drawer 14 back into support frame 12.

Visible within FIGS. 1 and 3 are bundles of incoming and outgoing telecommunications lines that extend into support frame 12, and the ends of which are coupled to the rear face of pull-out drawer 14. These bundles are designated by reference numerals 24–40. The incoming lines may be coupled to the telephone company central office to provide telecommunications services; the outgoing lines might be those which extend from the underground vault to various customers' premises. In the preferred embodiment, 900 pairs of incoming and outgoing lines extend to each pull-out drawer.

Figure 2:
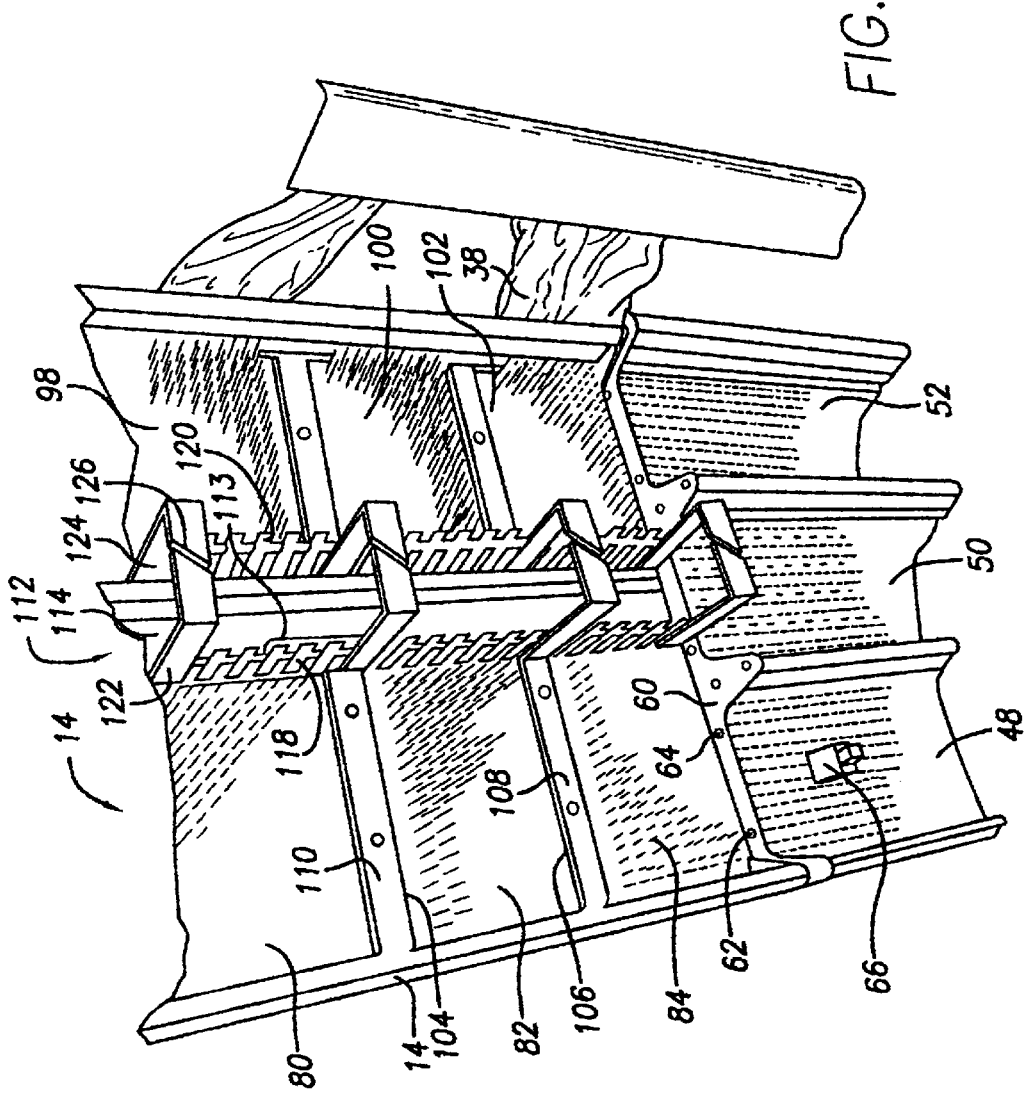
FIG. 2 is a partial perspective view of the drawer face shown in FIG. 1 and illustrating a series of terminal pin blocks, a wiring raceway, and a series of fuse protection blocks.

Referring to FIGS. 1 and 2, pull-out drawer 14 includes a series of nine fuse protection blocks identified by reference numerals 42, 44 and 46 along the top of drawer 14, and by reference numerals 48, 50, 52, 54, 56 and 58 in the lower region of drawer 14. These fuse protection blocks may be of the type that have long been available from Lucent Technologies and its predecessors under Model 309. Such fuse protection blocks are provided with mounting holes along their top and bottom edges. A metal bracket 60 (see FIG. 2) extends horizontally across the metal framework of drawer 14, and mounting screws 62 and 64 secure the upper end of fuse protection block 48 to bracket 60. A similar metal bracket supports the lower ends of fuse protection blocks 48, 50 and 52. Each of the fuse protection blocks has a first generally-planar face (see FIGS. 1 and 2) presenting fuse protection sockets on a first side of said drawer, and said plurality of fuse protection blocks each have an opposing rear face from which wiring terminals extend on an opposing second side of said drawer; Each of the nine fuse protection blocks includes a 5 column by 20 row array of fuse protection sockets, and is adapted to receive up to one-hundred removable plug-in fuses, one of which is designated by reference numeral 66 in FIG. 2. Thus each pull-out drawer can hold 900 fuses. Each of the fuse protection blocks includes wire-wrap terminals on its rear sides for electrical interconnect, as illustrated in FIG. 3.

Still referring to FIGS. 1 and 2, a first bank of nine terminal pin blocks 68-84, and a second bank of nine terminal pin blocks 86, 88, 90, 92, 94, 96, 98, 100, and 102, are also mounted to pull-out drawer 14. These terminal pin blocks each have a first generally-planar front face (visible in FIGS. 1 and 2) from which wiring pins extend in a first direction from the front side of the drawer. Each terminal pin block also has an opposing rear face (hidden by wiring in FIG. 3) from which such wiring pins extend in an opposing second direction. The front face of each of the fuse protection blocks generally lie in a common plane along with the front face of each of the terminal pin blocks.

These terminal pin blocks may be of the general type commercially available from Lucent Technologies and its predecessors under Model No. WE251H. The Model WE251H terminal pin block includes pins that are longer than needed or desired. Accordingly, these pins are either cut to a shorter length, or such terminal pin blocks can be produced with shorter pins.

The eighteen terminal pin blocks 68–102 each have an array of 10 rows x 20 columns of wire-wrap pins that extend both in front of the terminal pin block (as shown in FIGS. 1 and 2) and continue rearwardly behind the terminal pin block (for connection to the wiring shown in FIG. 3). Going across each row of wire-wrap pins are ten pairs of "T" (tip) and "R" (ring) pins associated with a particular telephone line. Thus, there are 900 tip and ring pairs in the first bank of terminal pin blocks 68–84, and 900 more tip and ring pairs in the second bank of terminal pin blocks 86–102. Therefore, 900 pairs of such pins can be associated with 900 incoming lines, and the other 900 pairs of such pins can be associated with 900 outgoing lines. As mentioned above, the incoming lines are preferably connected first to one side of the fuse protection sockets; the second sides of the fuse protection sockets are connected by a series of connection wires to the wiring pins of the terminal pin blocks. Such connection wires are generally shown in FIG. 3 and are disposed upon the rear side of the drawer. The incoming and outgoing lines are independent of each other until they are "cross-connected", as by extending a wire on the front face of drawer 14 between a "tip" pin of an incoming line and the "tip" pin of an outgoing line. Such a cross-connect, or configuration, wire is shown in FIG. 2 by reference numeral 113 extending from a pin on terminal pin block 80 to a pin on terminal pin block 82.

Thus, pull-out drawer 14 allows a telephone company technician to add or change service to a customer by using the same underground vault in which the fuse protection blocks are maintained, thereby avoiding the need to visit a separate equipment board at the user's site. The preferred pull-out drawer is very dense and can be used to hold 900 fuses, and make 900 switchable connections via the associated terminal pin blocks.

As shown in FIG. 2, the terminal pin blocks are generally rectangular and have first and second opposing edges spaced from each other; for example, in FIG. 2, terminal pin block 82 extends between opposing edges 104 and 106. A series of metal braces, such as braces 108 and 110 extend horizontally across the metal drawer framework for supporting opposing edges 104 and 106 of terminal pin block 82. In this manner, terminal pin blocks 68–102 can be supported in a highly-dense fashion on drawer 14.

Still referring to FIGS. 1 and 2, the two banks of terminal pin blocks are disposed on either side of a wiring raceway 112. Wiring raceway 112 is actually comprised of three identical raceways laid end-to-end, each being screwed down to the cross-braces 108/110. Wiring raceway 112 helps guide the configuration wires, such as configuration wire 113, between the various terminal pin blocks. As shown best in FIG. 2, wiring raceway 112 includes a planar base 114 for being secured to the front face of drawer 14. Wiring raceway 112 includes first and second opposing side edges from which outwardly-directed fingers extend, such as fingers 118 and 120. These fingers are spaced apart from one another to permit configuration wires, like configuration wire 113, to be inserted therebetween through the first and second sides of wiring raceway 112. Each such finger includes a tab that projects toward a correspondingly-shaped cut-out in the next-adjacent finger for allowing a technician to insert configuration wires between adjacent fingers, while keeping previously inserted configuration wires in place.

Identifying indicia may be printed directly on both the fuse protection blocks and on the terminal pin blocks, or on panel labels secured adjacent to such fuse protection blocks and terminal pin blocks, to help service technicians quickly locate particular incoming or outgoing lines.

Preferably, wiring raceway 112 includes overpasses, or arches, that protect the configuration wires inside wiring raceway 112. In FIG. 2, enlarged fingers 122 and 124 converge toward each other above wiring raceway 112 to form a protective overpass. The upper ends of fingers 122 and 124 are spaced from each other by a slot 126 which extends diagonally at an angle to wiring raceway 112 for allowing configuration wiring to be passed through the protective overpass.

Figure 4:
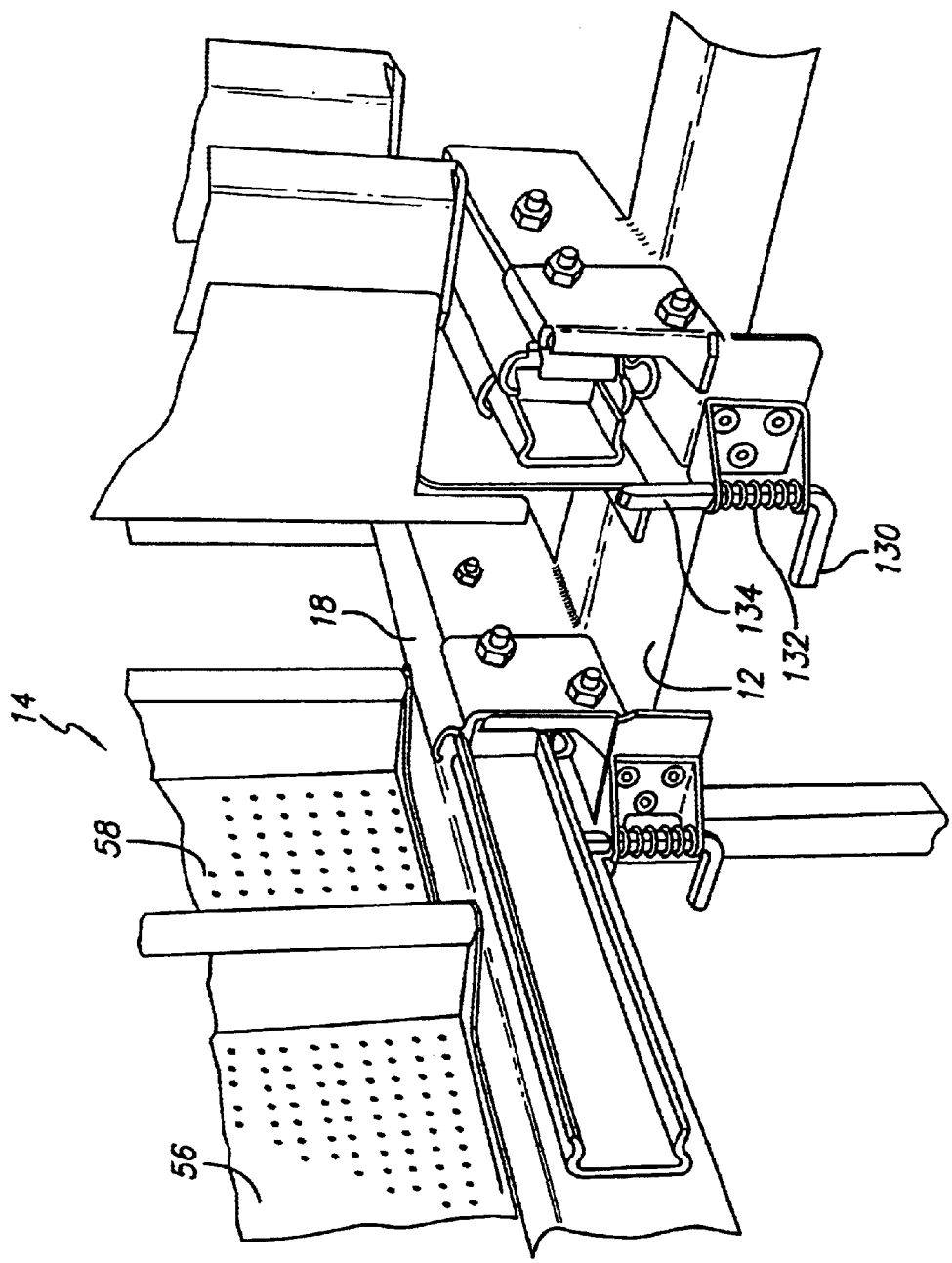
FIG. 4 is a partial perspective view of the lower portion of two adjacent pull-out drawers and illustrating a foot-operated latch for selectively maintaining the drawer in its retracted position.

FIG. 4 shows a foot-operated spring biased latch that is used to prevent drawer 14 from inadvertently sliding out of support frame 12. L-shaped latch 130 is biased upwardly by spring 132 to interfere with outward movement of the sliding drawer. When a technician steps on the lower end of latch 130, the upper end 134 of latch 130 moves downwardly, thereby allowing the sliding drawer to be pulled out for service.

Those skilled in the art will now appreciate that an improved high-density telecommunications drawer assembly has been described. While the present invention has been described with respect to preferred embodiments thereof, such description is for illustrative purposes only, and is not to be construed as limiting the scope of the invention. For example, it may be desired to place all of the fuse protection blocks on a first drawer, and all of the terminal pin blocks (and wiring raceways) on a second drawer, and then interconnect the fuse protection drawer with the terminal pin block drawer via wires extending between the two drawers. In addition, while the terms "incoming" and "outgoing" have been used to refer to the telephone company side, and the customer site side, respectively, those skilled in the art will understand that such meanings could be reversed without detracting from the benefits of the present invention. Various other modifications and changes may be made to the described embodiments by those skilled in the art without departing from the true spirit and scope of the invention as defined by the appended claims.

I claim:

1. A pull-out drawer assembly for interconnecting telecommunications wiring, comprising in combination:
    a. a support frame;
    b. a drawer slidingly supported by said support frame for movement between a stored position disposed within said support frame and an extended position projecting from said support frame;
    c. a plurality of incoming telecommunications lines extending into said support frame from a central office to provide telecommunications services, said incoming lines being coupled to said drawer;
    d. a plurality of outgoing telecommunications lines extending from said support frame for coupling to a user's premises, said outgoing lines being coupled to said drawer;
    e. a plurality of fuse protection blocks mounted to said drawer, each of said fuse protection blocks having a plurality of sockets for receiving a corresponding plurality of removable fuses, and each of said sockets being coupled to one of said incoming telecommunications lines, said plurality of fuse protection blocks each having a first generally-lanar face presenting said plurality of sockets on a first side of said drawer, and said plurality of fuse protection blocks each having an opposing rear face from which wiring terminals extend on an opposing second side of said drawer;

f. a plurality of terminal pin blocks mounted to said drawer, each of said terminal pin blocks having a plurality of wiring pins, said plurality of wiring pins including a first group of wiring pins coupled to one of said sockets, and including a second group of wiring pins coupled to one of said outgoing telecommunications lines, said plurality of terminal pin blocks each having a first generally-planar face from which said wiring pins extend in a first direction from the first side of said drawer, and said plurality of terminal pin blocks each having an opposing rear face from which said wiring pins extend in an opposing second direction from the second side of said drawer; and g. the first generally planar face of each of said fuse protection blocks generally lying in a common plane with the first generally-planar face of each of said terminal pin blocks along the first side of said drawer.

2. The pull-out drawer assembly recited by claim 1 including a plurality of connection wires disposed upon the second side of said drawer, each of said connection wires coupling one of said fuse protection sockets to one of said wiring pins on the second side of said drawer.

3. The pull-out drawer assembly recited by claim 1 including a plurality of configuration wires extending between said plurality of wiring pins along the first side of said drawer.

4. The pull-out drawer assembly recited by claim 3 including a wiring raceway disposed between a first terminal pin block and a second terminal pin block on the first side of said drawer for guiding said plurality of configuration wires between said plurality of terminal pin blocks.

5. The pull-out drawer assembly recited by claim 4 wherein said wiring raceway includes a planar base for being secured to the first side of said drawer.

6. The pull-out drawer assembly recited by claim 5 wherein said planar base of said wiring raceway includes first and second opposing side edges corresponding to first and second sides of said wiring raceway, and wherein said wiring raceway includes outwardly-directed fingers extending from the opposing first and second side edges of said base, said fingers being spaced apart from one another to permit configuration wires to be inserted therebetween through the first and second sides of said wiring raceway.

7. The pull-out drawer assembly recited by claim 6 wherein a first finger on one side of said raceway and a second finger on the second side of said raceway opposite to the first finger converge toward each other above said wiring raceway to form a protective overpass above said planar base of said wiring raceway to help protect wiring therein.

8. The pull-out drawer assembly recited by claim 7 wherein the first and second fingers are spaced from each other by a slot which extends at an angle to said wiring raceway for allowing configuration wiring to be passed through said protective overpass.

9. The pull-out drawer assembly recited by claim 6 wherein each of said fingers includes a tab that projects toward a correspondingly-shaped cut-out in the next-adjacent finger for allowing a technician to insert configuration wires between adjacent fingers, while keeping previously inserted configuration wires in place.

10. A pull-out drawer assembly for interconnecting telecommunications wiring, comprising in combination:

a. a support frame;

b. a drawer slidingly supported by said support frame for movement between a stored position disposed within said support frame and an extended position projecting from said support frame, said drawer including a drawer framework;

c. a first plurality of telecommunications lines extending into said support frame and coupled to said drawer;

d. a second plurality of telecommunications lines extending into said support frame and coupled to said drawer;

e. a plurality of terminal pin blocks, each of said terminal pin blocks having a plurality of wiring pins, said plurality of wiring pins including a first group of wiring pins coupled to one of said first plurality of telecommunications lines, and a second group of wiring pins coupled to one of said second plurality of telecommunications lines, each of said terminal pin blocks being generally rectangular and having first and second opposing edges spaced from each other by a predetermined width; and;

f. a plurality of braces extending across the drawer framework and spaced from each other by said predetermined width, each terminal pin block being supported from its first and second opposing edges between two of said plurality of braces.

11. The pull-out drawer assembly recited by claim 10 further including a plurality of fuse protection blocks mounted to said drawer, each of said fuse protection blocks having a plurality of sockets for receiving a corresponding plurality of removable fuses.

12. The pull-out drawer assembly recited by claim 10 wherein:

a. said plurality of fuse protection blocks each have a first generally-planar face presenting said plurality of sockets on a first side of said drawer, and said plurality of fuse protection blocks each have an opposing rear face from which wiring terminals extend on an opposing second side of said drawer;

b. said plurality of terminal pin blocks each have a first generally-planar face from which said wiring pins extend in a first direction from the first side of said drawer, and said plurality of terminal pin blocks each have an opposing rear face from which said wiring pins extend in an opposing second direction from the second side of said drawer; and c. the first generally planar face of each of said fuse protection blocks generally lie in a common plane with the first generally-planar face of each of said terminal pin blocks along the first side of said drawer.

13. The pull-out drawer assembly recited by claim 12 including a plurality of connection wires disposed upon the second side of said drawer, each of said connection wires coupling one of said fuse protection sockets to one of said wiring pins on the second side of said drawer.

14. The pull-out drawer assembly recited by claim 12 including a plurality of configuration wires extending between said plurality of wiring pins along the first side of said drawer.

15. The pull-out drawer assembly recited by claim 14 including a wiring raceway disposed between a first terminal pin block and a second terminal pin block on the first side of said drawer for guiding said plurality of configuration wires between said plurality of terminal pin blocks.

16. The pull-out drawer assembly recited by claim 15 wherein said wiring raceway includes a planar base for being secured to the first side of said drawer.

17. The pull-out drawer assembly recited by claim 16 wherein said planar base of said wiring raceway includes first and second opposing side edges corresponding to first and second sides of said wiring raceway, and wherein said wiring raceway includes outwardly-directed fingers extending from the opposing first and second side edges of said base, said fingers being spaced apart from one another to permit configuration wires to be inserted therebetween through the first and second sides of said wiring raceway.

18. The pull-out drawer assembly recited by claim 17 wherein a first finger on one side of said raceway and a second finger on the second side of said raceway opposite to the first finger converge toward each other above said wiring raceway to form a protective overpass above said planar base of said wiring raceway to help protect wiring therein.

19. The pull-out drawer assembly recited by claim 18 wherein the first and second fingers are spaced from each other by a slot which extends at an angle to said wiring raceway for allowing configuration wiring to be passed through said protective overpass.

20. The pull-out drawer assembly recited by claim 17 wherein each of said fingers includes a tab that projects toward a correspondingly-shaped cut-out in the next-adjacent finger for allowing a technician to insert configuration wires between adjacent fingers, while keeping previously inserted configuration wires in place.

\* \* \* \* \*